(No Model.)

C. W. GOOCH.
ROLLER SKATE.

No. 307,643. Patented Nov. 4, 1884.

Witnesses:
Orra C. Moore.
W. T. Anderson.

Inventor:
Charles W. Gooch,
By Thomas G. Orwig, Att'y.

United States Patent Office.

CHARLES W. GOOCH, OF BOONESBOROUGH, IOWA.

ROLLER-SKATE.

SPECIFICATION forming part of Letters Patent No. 307,643, dated November 4, 1884.

Application filed April 3, 1884. (No model.)

*To all whom it may concern:*

Be it known that I, CHARLES W. GOOCH, of Boonesborough, in the county of Boone and State of Iowa, have invented an Improved Roller-Skate, of which the following is a specification.

My improvement relates to the manner of attaching the rollers to the axles, and my object is to prevent the damaging of garments and avoid the dangers and accidents incident to the use of roller-skates that have their journals projecting through the rollers, and secured by means of fastening devices attached to the ends of the journals. In all cases where a journal projects entirely through a roller oil will escape and accumulate on the outside face of the roller and rub off upon garments that come in contact therewith, and pins, keys, split rings, and other extraneous fastening devices that are fixed to the journal outside of the roller to retain it are liable to catch garments and to cause accidents.

Heretofore a roller has been provided with a bushing or journal-box that had a flange at its inner open end, and a journal retained from longitudinal movement therein by means of a collar and semicircular washer-plates.

My improvement consists in forming a flange integral with the outside and closed end of a journal-box and oil-cup, and combining it with a roller and an axle having a journal and an annular bead at the inner end of the journal, and a disk having a circular recess and an annular projection or ring formed integral therewith by means of two semicircular washer-plates and two or more screw-bolts, as hereinafter fully set forth.

Figure 1:
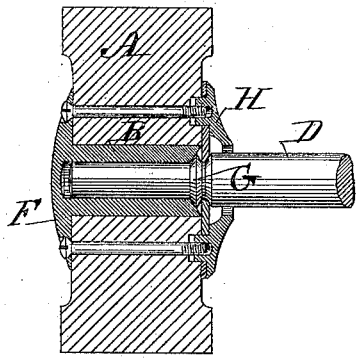
Figure 2:
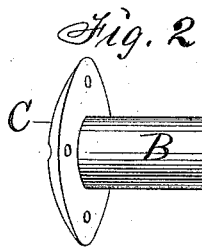
Figure 4:
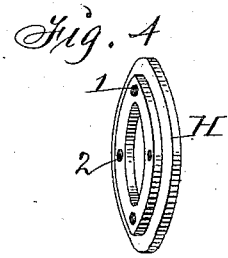
Figure 3:
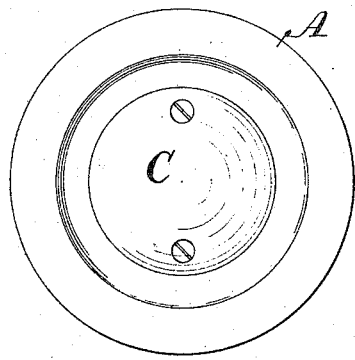
Figure 5:
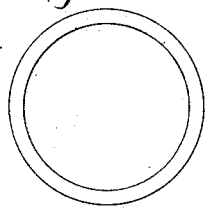
Figure 6:
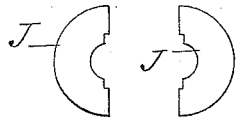

Figure 1 of my accompanying drawings shows a half-section of a roller combined with a journal and section of an axle. Fig. 2 is a perspective view of my journal-cap and oil-cup. Fig. 3 is an end view or outside face of a roller. Fig. 4 is a perspective view of a disk having a recess on its inside face. Fig. 5 represents a rubber ring or gasket, and Fig. 6 my semicircular washer-plate.

Jointly considered, these figures clearly illustrate the construction, operation, and utility of my complete invention.

A represents a roller that is preferably made of hard wood, and that may vary in size, as desired. It has a transverse bore through its center for the reception of a journal-box.

B is a journal-box and oil-cup. It has a flange, C, at its closed end that has a flat inside face and a convex outside face.

D is an axle that is designed to be fixed to the frame of a skate, and that has journals F on its ends and annular beads G at the inner ends of the journals.

H is a disk that has a recess on its inner face and an annular shoulder around the recess for the reception of the semicircular washers J, and also screw-threaded bores 1 2 3 for the reception of screw-bolts.

To fasten all the parts together I first insert the box and oil-cup in the roller, place the washers J in the recess in the inside face of the disk H, and slip the disk over the journal and allow the inner edges of the washers to enter the annular groove that exists between the bead and the shoulder at the end of the axle, as clearly shown in Fig. 1. By then inserting the free end of the journal into the box and oil-cup and passing screw-bolts through the flange C, and through the roller into the disk H, all the parts can be firmly united, and an elastic gasket or packing clamped between the disk and inner face of the roller. Openings in the contiguous edges of the semicircular washers and a space between the disk and the axle allow oil to be introduced into the journal-box and oil-cup from the inner face of the roller to enter a cavity at the extreme end of the journal, and the flange and closed bottom of the cup prevent the oil from getting upon the outside face of the roller.

I claim as my invention—

The journal-box and oil-cup B, having a fixed flange, C, at its closed end, the axle D, having a journal, F, and an annular bead, G, a disk, H, having a circular recess in the center of its inside face, and an annular and perforated projection around the circular recess, two semicircular washer-plates, and two or more screw-bolts, in combination with a roller in a roller-skate, substantially as shown and described, for the purposes stated.

CHARLES W. GOOCH.

Witnesses:
THOMAS G. ORWIG,
J. A. MARTIN.